United States Patent
Naito et al.

(10) Patent No.: US 11,457,161 B2
(45) Date of Patent: Sep. 27, 2022

(54) IMAGING DEVICE MOVING AN IMAGING ELEMENT A PREDETERMINED AMOUNT FOR EACH EXPOSURE TO ACQUIRE A PLURALITY OF IMAGES, IMAGE BLUR CORRECTION METHOD, AND RECORDING MEDIUM

(71) Applicant: CANON KABUSHIKI KAISHA, Tokyo (JP)

(72) Inventors: Go Naito, Kanagawa (JP); Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/143,473

(22) Filed: Jan. 7, 2021

(65) Prior Publication Data

US 2021/0218895 A1    Jul. 15, 2021

(30) Foreign Application Priority Data

Jan. 15, 2020    (JP) .............................. JP2020-004116

(51) Int. Cl.
*H04N 5/349*    (2011.01)
*H04N 5/232*    (2006.01)

(52) U.S. Cl.
CPC ......... *H04N 5/349* (2013.01); *H04N 5/23287* (2013.01)

(58) Field of Classification Search
CPC .......... H04N 5/23248–23287; H04N 5/23232; H04N 5/349; G03B 2205/0007–0038; G03B 2205/0053–0084; G02B 27/64; G02B 27/646; G06T 3/4053; G06T 3/4069

See application file for complete search history.

(56) References Cited

U.S. PATENT DOCUMENTS

| | | | |
|---|---|---|---|
| 9,883,107 B2 | 1/2018 | Yoshida | |
| 2006/0087561 A1* | 4/2006 | Kojima | H04N 5/23287 348/208.5 |
| 2016/0212332 A1* | 7/2016 | Tang | G02B 26/0875 |
| 2017/0272655 A1* | 9/2017 | Sakurai | H04N 5/2327 |

FOREIGN PATENT DOCUMENTS

JP    2017-037130 A    2/2017

* cited by examiner

*Primary Examiner* — Paul M Berardesca
(74) *Attorney, Agent, or Firm* — Cowan, Liebowitz & Latman, P.C.

(57) ABSTRACT

Provided is an imaging device that performs a pixel shift for moving an imaging element a predetermined shift amount for each exposure to acquire a plurality of images and synthesizes the plurality of images to generate a high-resolution image, the imaging device including: a signal processing unit that sets an image blur correction target value on the basis of a shake of the imaging device detected by a vibration detection unit; and an image blur correction unit that corrects an image blur in accordance with the image blur correction target value, wherein the signal processing unit fixes the image blur correction target value to a predetermined value when the pixel shift is performed.

12 Claims, 8 Drawing Sheets

|  | L1 | L2 | L3 | L4 |
|---|---|---|---|---|
| 14e1 | +V | −2V | −2V | +2V |
| 14e2 | +V | +V | −2V | −2V |
| 14e3 | −V | +2V | +2V | −2V |
| 14e4 | −V | −V | +2V | +2V |

# IMAGING DEVICE MOVING AN IMAGING ELEMENT A PREDETERMINED AMOUNT FOR EACH EXPOSURE TO ACQUIRE A PLURALITY OF IMAGES, IMAGE BLUR CORRECTION METHOD, AND RECORDING MEDIUM

BACKGROUND OF THE INVENTION

Field of the Invention

The present invention relates to an imaging device, an image shake correction method, and a recording medium.

Description of the Related Art

There is a technique of performing image capture multiple times while an imaging surface is moved a predetermined shift amount and synthesizing a plurality of obtained images to generate a high-resolution image. Japanese Patent Laid-Open No. 2017-37130 discloses a technique of not performing image blur correction in the case of a high-resolution image capture mode for synthesizing images obtained by performing still image exposure multiple times.

However, if image blur correction is not performed during high-resolution image capture as in Japanese Patent Laid-Open No. 2017-37130, the resolution of an image is lowered due to the influence of a camera shake in an image capture scene in which each image capture second of a plurality of still image exposures is long.

SUMMARY OF THE INVENTION

The present invention provides an imaging device that makes it possible to perform high-accuracy image blur correction even in a high-resolution image capture mode for synthesizing images obtained in a plurality of still image exposures.

According to the present invention, there is provided an imaging device that performs a first process of moving an imaging element a predetermined amount for each exposure to acquire a plurality of images and synthesizes the plurality of images to generate a high-resolution image, the imaging device including: at least one processor and a memory holding a program which makes the processor function as: a target value setting unit configured to set an image blur correction target value on the basis of a shake of the imaging device detected by a detection unit: and a correction unit configured to perform a second process of correcting an image blur in accordance with the image blur correction target value, wherein the target value setting unit fixes the image blur correction target value to a predetermined value when the first process is performed.

Further features of the present invention will become apparent from the following description of exemplary embodiments with reference to the attached drawings.

DESCRIPTION OF THE EMBODIMENTS

First Embodiment

Figure 1:
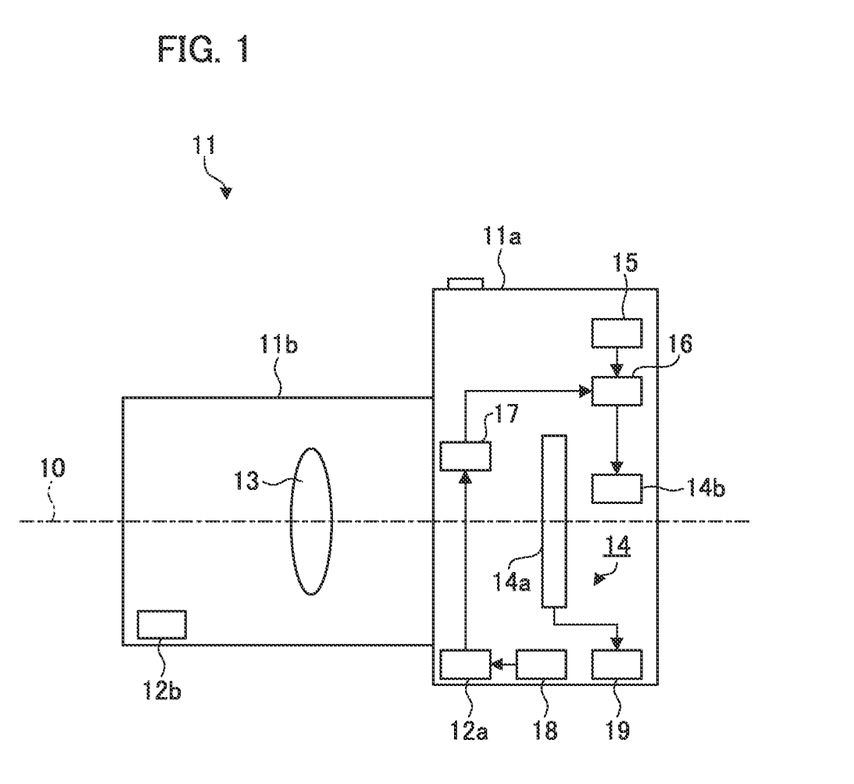
FIG. 1 is a diagram illustrating a configuration of an imaging device.

FIG. 1 is a diagram illustrating a configuration of an imaging device. An imaging device 11 in the present embodiment is a digital camera that includes an image blur correction unit 14 and can generate an image having a high resolution by performing pixel shift image capture while moving an imaging surface a predetermined shift amount. Hereinafter, an image capture mode of performing so-called high-resolution image capture by synthesizing a plurality of images obtained by performing pixel shift image capture to generate a high-resolution image is referred to as a "high-resolution image capture mode." Meanwhile, although a lens-interchangeable imaging device in which a lens device can be attached to and detached from a main body will be described as an example of an imaging device in the present embodiment, there is no limitation thereto, and it may be an imaging device in which the lens device and the main body are formed integrally with each other.

The imaging device 11 includes a camera body 11a and an interchangeable lens 11b capable of being attached to and detached from the camera body 11a. The camera body 11a includes a camera CPU 12a, an imaging element 14a, a driving unit 14b, a vibration detection unit 15, a signal processing unit 16, a vibration-proof control unit 17, a still image exposure unit 18, and an image processing unit 19. The interchangeable lens 11b is provided with an imaging optical system including a lens CPU 12b and a focus adjustment unit 13.

The imaging optical system of the interchangeable lens 11b forms an optical image of a subject on the imaging element 14a. The imaging optical system includes a zoom lens that changes imaging magnification, a focus lens 13 used for focus adjustment, a plurality of lenses including a shift lens that corrects an image blur caused by a camera shake or the like, and an aperture. The lens CPU 12b provided in the interchangeable lens 11b controls a lens operation in accordance with an imaging instruction or the like from the camera body 11a. For example, the lens CPU 12b performs focus adjustment by driving the focus lens 13 in accordance with a focus state detection signal from the camera body 11a.

A subject light flux along an optical axis 10 is incident on the imaging element 14a which is an imaging unit through the imaging optical system of the interchangeable lens 11b. The imaging element 14a photoelectrically converts a subject image formed on the imaging surface through the imaging optical system, and outputs an image signal related to the subject image. The imaging element 14a is, for example, a charged coupled device (CCD) or a complementary metal oxide semiconductor (CMOS) sensor. The driving unit 14b drives the imaging element 14a in a plane orthogonal to the optical axis 10. In a high-resolution image capture mode of performing a plurality of still image exposures, the driving unit 14b performs a pixel shift (first process) for moving the imaging surface of the imaging element 14a in each still image exposure.

The camera CPU 12a provided in the camera body 11a controls an operation of each block included in the imaging device 11. For example, the camera CPU 12a controls an image capture operation in accordance with an imaging instruction operation or the like from a photographer, or controls an image blur correction system operation.

The vibration detection unit 15 detects a vibration of the imaging device 11 as a shake detection signal. The vibration detection unit 15 is, for example, an angular velocimeter, and detects a shake angular velocity applied to the imaging device 11. The signal processing unit 16 is a target value setting unit configured to set an image blur correction target value, processes a shake detection signal detected by the vibration detection unit 15, and converts the signal into an image blur correction target value which is a driving signal for driving the imaging element 14a in order to correct an image blur. In this manner, the shake detection signal detected by the vibration detection unit 15 is converted into an image blur correction target value which is appropriate to image blur correction in the signal processing unit 16. The vibration-proof control unit 17 controls the operation of the signal processing unit 16 on the basis of each piece of exposure timing information from the camera CPU 12a. Meanwhile, the signal processing unit 16 and the vibration-proof control unit 17 may be realized as the camera CPU 12a.

The image blur correction target value which is output from the signal processing unit 16 is input to the driving unit 14b that drives and controls the imaging element 14a. The driving unit 14b performs image blur correction (second process) by moving the imaging element 14a within the imaging surface on the basis of the image blur correction target value. This allows an image blur in a direction along the imaging surface to be corrected by the optical system. In this manner, in the present embodiment, the imaging element 14a and the driving unit 14b constitute the image blur correction unit 14.

The still image exposure unit 18 sets an exposure time, an aperture value, ISO sensitivity, or the like according to the brightness of a subject, and transmits the results to the camera CPU 12a. The camera CPU 12a controls exposure on the basis of information of the still image exposure unit 18. In a high-resolution image capture mode, the camera CPU 12a performs a plurality of still image exposures on the basis of the information of the still image exposure unit 18, and moves the imaging surface of the imaging element 14a in each still image exposure.

The image processing unit 19 performs various types of image processing on an image signal which is output from the imaging element 14a. For example, the image processing unit 19 performs processing such as denoising, demosaicing, luminance signal conversion, aberration correction, white balance adjustment, or color correction of the image signal which is output from the imaging element 14a, as image processing. In addition, in the high-resolution image capture mode, the image processing unit 19 synthesizes imaging signals of images which are output by the imaging element 14a to create a high-resolution image.

Figure 2:
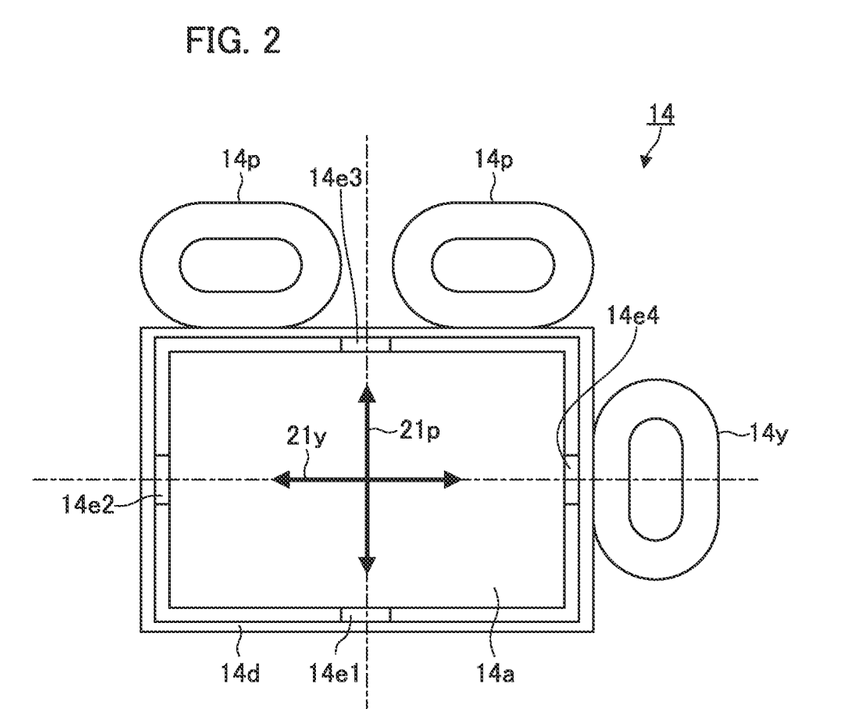
FIG. 2 is a diagram illustrating an image blur correction unit.

Image blur correction and pixel shift image capture by driving the imaging element 14a will be described with reference to FIG. 2. FIG. 2 is a diagram illustrating the image blur correction unit 14. FIG. 2 shows the imaging element 14a from the subject side. The imaging element 14a is held by a holding frame 14d.

The holding frame 14d is provided with coils 14p and a coil 14y. As for the coils, for example, two coils 14p are provided on the long side of the holding frame 14d, and one coil 14y is provided on the short side of the holding frame 14d. The coils 14p and the coil 14y face a permanent magnet (not shown). Therefore, the holding frame 14d is driven in the direction of an arrow 21p if the driving unit 14b allows electrical conduction to the coils 14p on the basis of the image blur correction target value from the signal processing unit 16, and the holding frame 14d is driven in the direction of an arrow 21y if it allows electrical conduction to the coil 14y.

A total of four laminated piezoelectric members 14e1 to 14e4 are interposed between the imaging element 14a and the holding frame 14d, one on each side. The imaging element 14a is held by the holding frame 14d by being interposed between and supported by the four laminated piezoelectric members 14e1 to 14e4. The laminated piezoelectric members 14e1 to 14e4 are piezoelectric elements for driving the imaging element 14a in order to perform pixel shift image capture. The laminated piezoelectric members 14e1 to 14e4 drive the imaging element 14a on the basis of a driving signal for pixel shift image capture. Meanwhile, in the present embodiment, an example in which the imaging element 14a is driven by the laminated piezoelectric members 14e1 to 14e4 to perform a pixel shift will be described, but there is no limitation thereto. For example, the imaging element 14a may be driven by the coils 14p and the coil 14y to perform a pixel shift.

Figure 3:
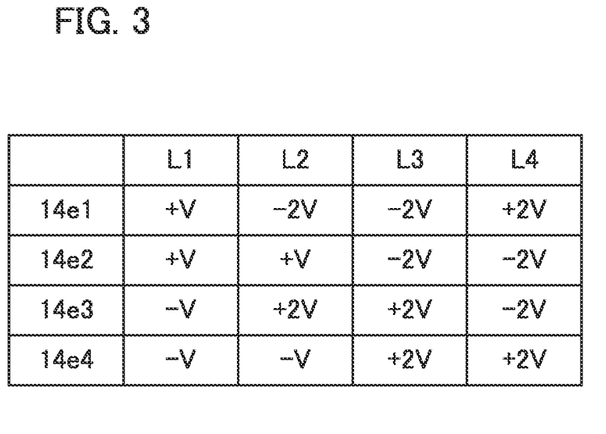
FIG. 3 is a diagram illustrating image capture operations.
Figure 4:
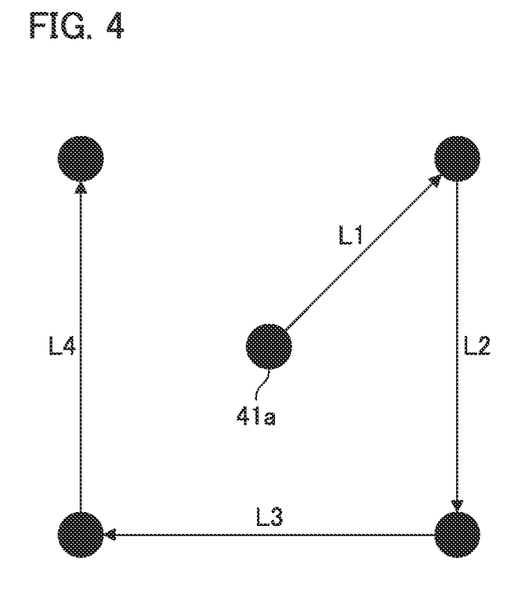
FIG. 4 is a diagram illustrating an example of the movement of an imaging surface.

A relationship between electrical conduction to the laminated piezoelectric members 14e1 to 14e4 and driving of the imaging element 14a will be described with reference to FIGS. 3 and 4. FIG. 3 is a diagram illustrating electrical conduction to the laminated piezoelectric members. FIG. 4 is a diagram illustrating driving of the imaging element 14a. In FIG. 3, the length shows the laminated piezoelectric members 14e1 to 14e4. Pixel shifts L1 to L4 show the direction of movement and amount of movement of the imaging element 14a in the pixel shifts. That is, FIG. 3 shows a voltage to be applied to each of the laminated piezoelectric members 14e1 to 14e4 for the movement of the pixel shifts L1 to L4.

There are several methods in a pixel shift. In the present embodiment, a method of shifting a pixel by a half pixel in length and width with respect to a reference pixel 41a which is the position of a pixel when a reference image is captured will be described. That is, in the high-resolution image capture mode, a total of five images of a reference image and four images captured by performing a pixel shift are acquired and synthesized. Meanwhile, a pixel shift method and the number of images to be acquired are not limited thereto.

The imagine element 14a is moved to a position shifted by a half pixel in length and width from the reference pixel 41a by the pixel shift L1. For the pixel shift L1, for example, an applied voltage is applied to the laminated piezoelectric member 14e1, an applied voltage +V is applied to the laminated piezoelectric member 14e2, an applied voltage −V is applied to the laminated piezoelectric member 14e3, and an applied voltage −V is applied to the laminated piezoelectric member 14e4. Each movement distance of the pixel shifts L2 to L4 is one pixel, and the imaging element 14a is moved to a position shifted by a half pixel in length and width from the reference pixel 41a. In the pixel shill L2, the imaging element 14a is driven in the direction of the arrow 21p. In order to drive the imaging element 14a by one pixel in the direction of the arrow 21p, for example, an applied voltage −2V is applied to the laminated piezoelectric member 14e1, and an applied voltage +2V is applied to the laminated piezoelectric member 14e3. Meanwhile, since there is no driving in the direction of the arrow 21y, the voltages applied to the laminated piezoelectric member 14e2 and the laminated piezoelectric member 14e3 do not change, and thus the voltage applied to the laminated piezoelectric member 14e2 is the applied voltage +V as it is, and the voltage applied to the laminated piezoelectric member 14e4 is the applied voltage −V as it is. In this manner, in a case where the voltages applied to the laminated piezoelectric members 14e1 to 14e4 are set as appropriate values, pixel shift image capture can be performed by shifting the imaging element 14a by a half pixel in length and width from the reference pixel 41a.

Figure 5:
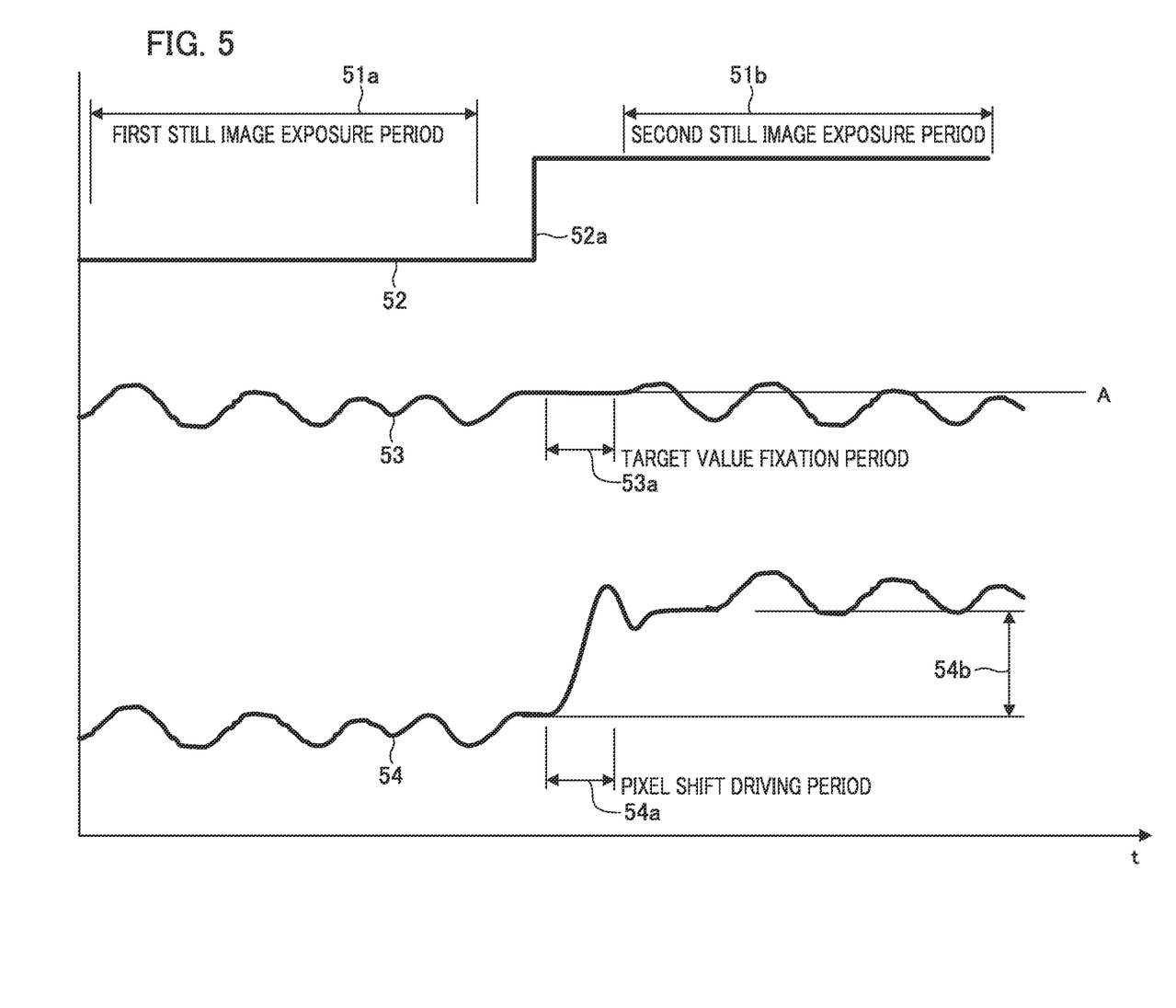
FIG. 5 is a diagram illustrating control of a vibration-proof control unit in pixel shift image capture.
Figure 6:
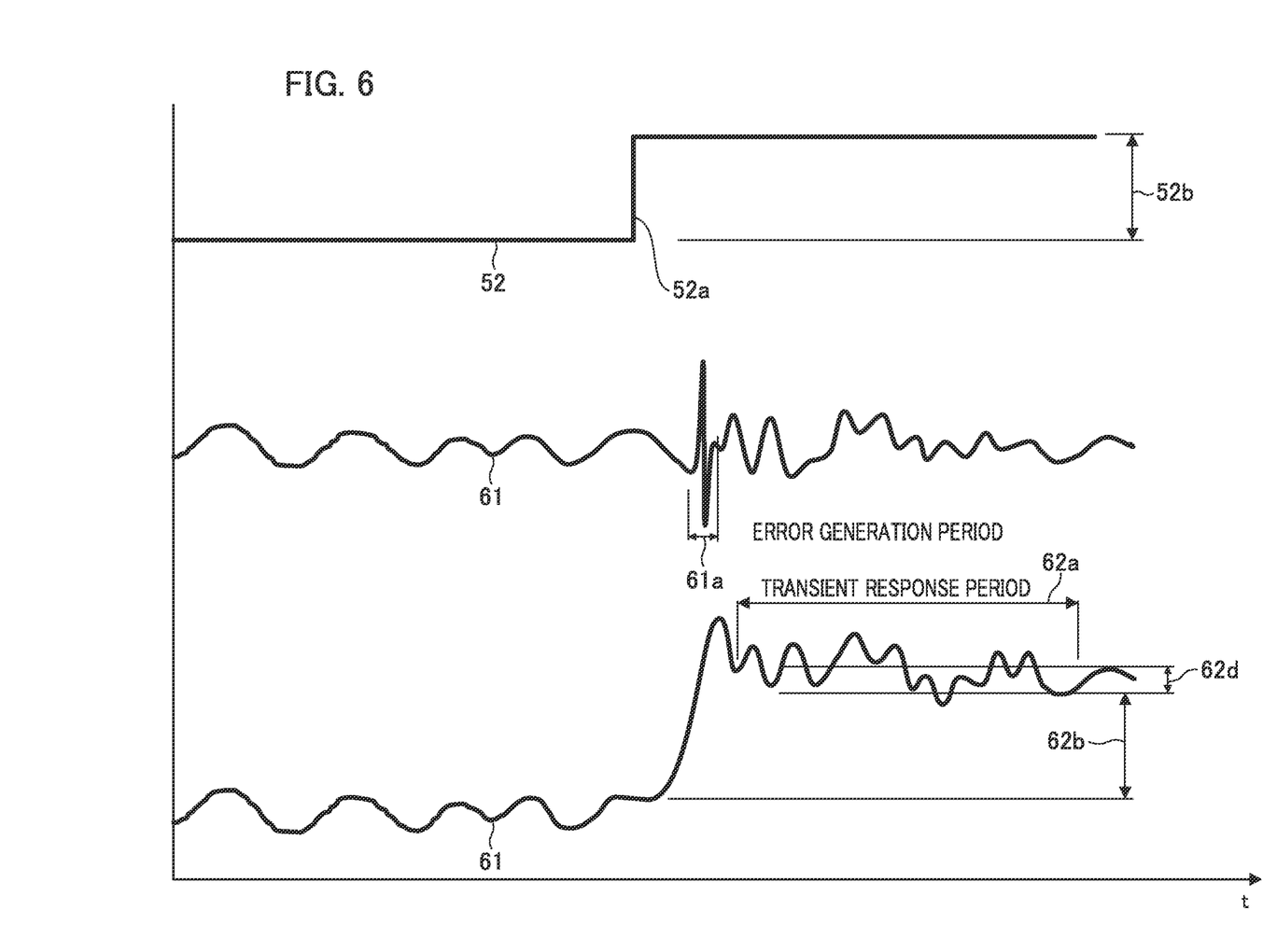
FIG. 6 is a diagram illustrating control of the vibration-proof control unit in pixel shift image capture of the related art.

Next, control of the vibration-proof control unit 17 in pixel shift image capture will be described with reference to FIGS. 5 and 6. FIG. 5 is a diagram illustrating control of the vibration-proof control unit 17 in pixel shift image capture of the present embodiment. On the other hand, FIG. 6 is a diagram illustrating control of the vibration-proof control unit 17 in pixel shift image capture of the related art. An image blur correction is performed at all times in an example of the related art, whereas, in the present embodiment, the image blur correction is temporarily stopped when a pixel shill is performed by providing a target value fixation period 53a of the image blur correction.

In the following description, as an example, an exposure period after the movement of the pixel shift L1 is defined as a first exposure period 51a, and an exposure period after the movement of the pixel shift L2 is defined as a second exposure period 51b. A pixel shift target value 52 shows a target value of a pixel shift in pixel shift image capture and a timing of the application of a voltage to a laminated piezoelectric member. A stepwise applied voltage 52a in the pixel shift target value 52 shows a timing of the application of a voltage for performing the pixel shift L2 between a first still image exposure period 51a and a second still image exposure period 51b. At the timing of the stepwise applied voltage 52a, a predetermined voltage is sent to each of the laminated piezoelectric members 14e1 to 14e4 as a pixel shift target value.

An image blur correction target value 53 is a target value of image blur correction which is given to the image blur correction unit 14 in order to perform image blur correction in the direction of the arrow 21p in FIG. 2. A current according to the image blur correction target value 53 flows to the coils 14p, and image blur correction is performed by the coils 14p driving the imaging element 14a. In the present embodiment, a period in which the stepwise applied voltage 52a is applied to the laminated piezoelectric members for a pixel shift and a predetermined period after that are set as the target value fixation period 53a, and the image blur correction target value 53 is fixed to a first value A. The first value A is, for example, a value before a shock is generated by driving for each pixel shift image capture, that is, a value at the start of the target value fixation period 53a.

The target value fixation period 53a is a period in which the imaging element 14a is driven in accordance with the stepwise applied voltage 52a. A predetermined period longer than the period in which the stepwise applied voltage 52a is applied is set as the target value fixation period 53a because there is a mechanical response delay or the like. In this manner, in the present embodiment, image blur correction according to the image blur correction target value 53 is performed in the first exposure period 51a and the second exposure period 51b, but the image blur correction target value 53 is fixed while a pixel shift between the first exposure period 51a and the second exposure period 51b is performed.

A waveform 54 is a waveform indicating the movement of the imaging surface of the imaging element 14a. The imaging surface of the imaging element 14a is driven on the basis of the pixel shift target value 52 and the image blur correction target value 53. A pixel shift driving period 54a is a period in which the pixel shift L2 between the first still image exposure period 51a and the second still image exposure period 51b is performed. A shift width 54b indicates the amount of movement of the imaging surface of the imaging element 14a in the pixel shift L2, and one pixel's worth of movement is performed in the present embodiment.

The reason for providing the target value fixation period 53a will be described below. FIG. 6 shows each waveform in a pixel shift of the related art in which the target value fixation period 53a is not set. Since the target value fixation period 53a is not set in the image blur correction target value 53 in FIG. 6, the image blur correction target value 53 is set and output in order to correct an image blur generated in the imaging element 14a even while the imaging element 14a is performing pixel shift driving by the stepwise applied voltage 52a.

In addition, the laminated piezoelectric members 14e1 to 14e4 have very high driving responsiveness. For this reason, in a case where driving of the imaging element 14a is speeded up in order to perform pixel shift image capture, a shock associated with the driving of the imaging element 14a is generated at the start and end of the driving for a pixel shift. The vibration detection unit 15 also detects a shock of pixel shift driving as the shake of the imaging element 14a. For this reason, an error signal (a shock error) according to the shock of pixel shift driving is generated in the image blur correction target value 53. A period in which the error signal is generated is an error generation period 61a. In a case where the imaging element 14a is driven on the basis of the error signal associated with pixel shift driving, a shift width 62d corresponding to the amount of the error signal is added to the amount of movement of the imaging surface, and an appropriate pixel shift cannot be performed.

Further, in a case where the image blur correction unit 14 performs a transient response on the basis of the error signal, the vibration of the transient response of the imaging element 14a shown in transient response period 62a is also detected by the vibration detection unit 15. The vibration component of the transient response is positively fed back, and a vibration waveform is repeated to the image blur correction target value 53.

In this manner, in a case where the driving of the imaging element 14a for performing pixel shift image capture is speeded up, the shock error and the transient response are generated, and thus an appropriate pixel shift cannot be performed. For this reason, in the present embodiment, the target value fixation period 53a is provided in a period in which a shock due to the driving for performing pixel shift image capture is generated, and control is performed so that the shock error and the transient response are suppressed. In the target value fixation period 53a, the image blur correction target value is fixed to the first value A before a shock is generated due to the driving for performing each pixel shift image capture, and the initialized image blur correction target value is added to the first value A after a shock has converged to restart image blur correction.

Figure 7:
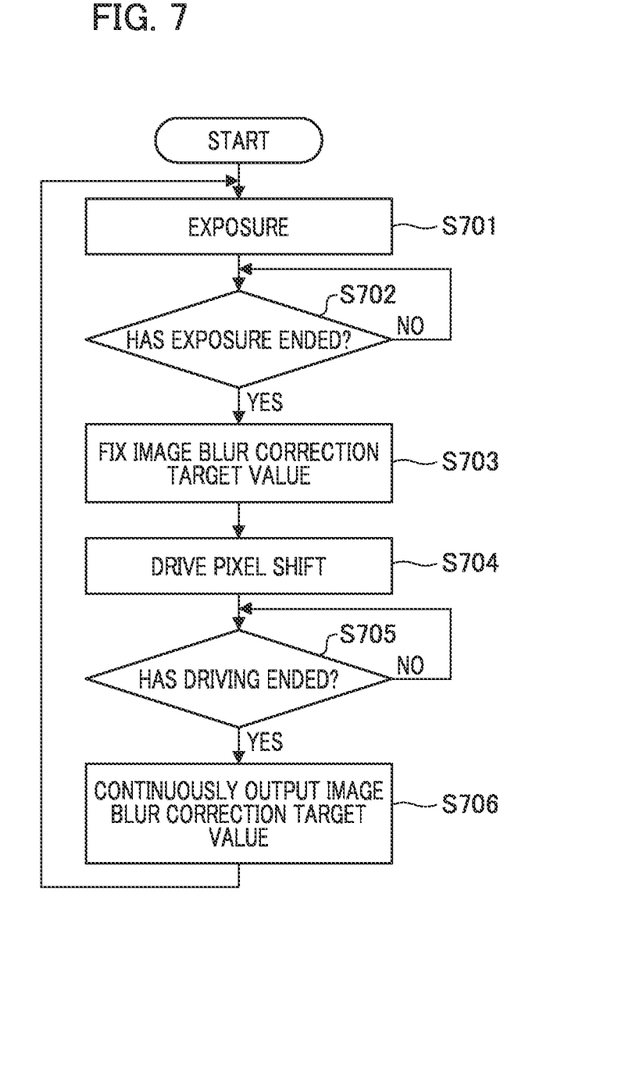
FIG. 7 is a flow chart illustrating processing of pixel shift image capture.

FIG. 7 is a flow chart illustrating a control operation of driving for performing pixel shift image capture and image blur correction driving. The present flow is controlled by the camera CPU 12a, and starts with the start of pixel shift image capture and image blur correction. In step S701, the camera CPU 12a gives an instruction for the start of exposure. In step S702, the camera CPU 12a determines whether the exposure has ended. If it is determined that the exposure has ended, the flow proceeds to step S703. On the other hand, step S702 is repeated until the exposure is completed.

In step S703, the camera CPU 12a fixes the image blur correction target value. Since the pixel shift driving is not performed at a point in time of step S703, a shock associated with the pixel shift driving is not generated, and the image blur correction target value is fixed to a value immediately before the generation of a shock. In step S704, the camera CPU 12a gives an instruction for the pixel shift driving. That is, the stepwise applied voltage 52a in FIG. 5 is output as a target value of a pixel shift.

In step S705, the camera CPU 12a determines whether driving of a pixel shift has ended. If it is determined that the driving of a pixel shift has ended, the camera CPU 12a proceeds to step S706, and releases the fixation of the image blur correction target value. On the other hand, if the driving of a pixel shift has not ended, step S705 is repeated until the pixel shift driving has ended. Step S705 is a step for avoiding the image blur correction target value being output again during the generation of a shock associated with the pixel shift driving. Therefore, it may be determined that the driving of a pixel shift has ended with the elapse of a predetermined time which is set in advance from the start of the pixel shift driving in step S704. In addition, the convergence of a shock applied to the imaging element 14a may be detected using a shock sensor or the like, and it may be determined that the driving of a pixel shift has ended if the shock has converged.

Figure 8:
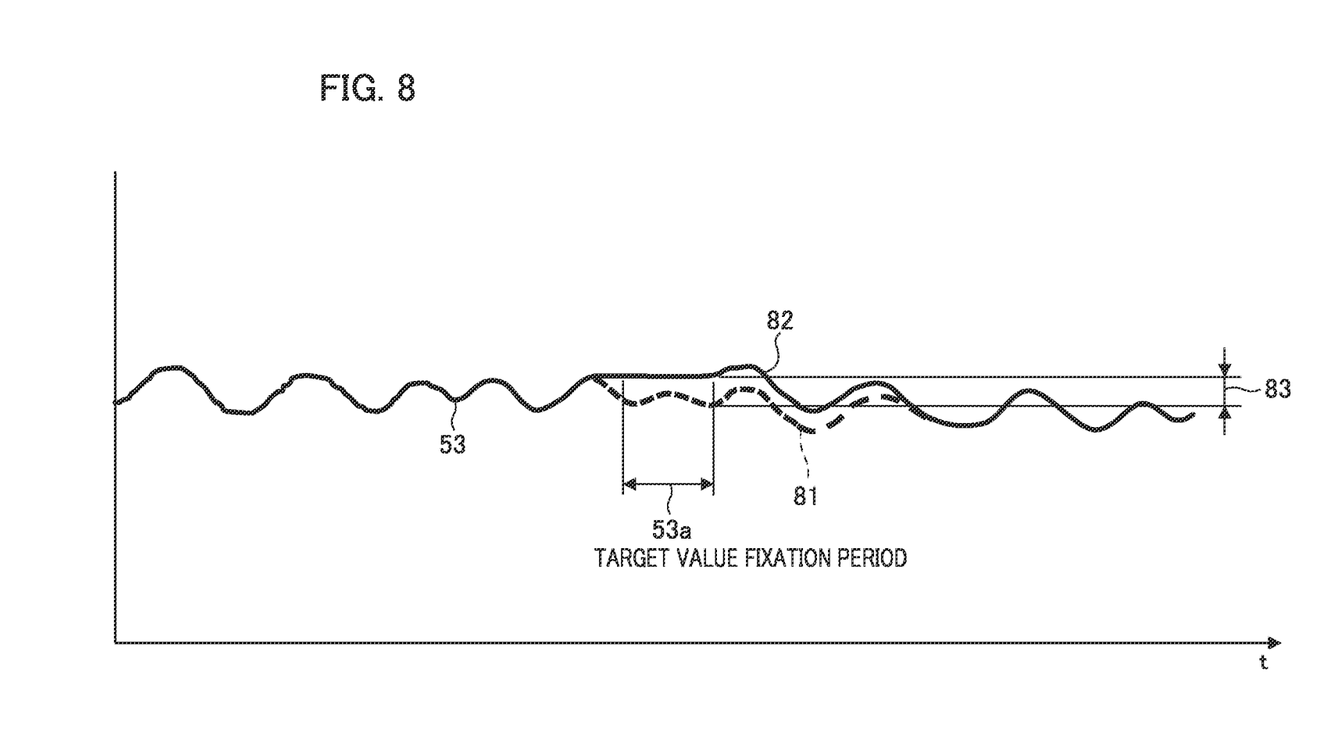
FIG. 8 is a diagram illustrating setting of an image blur correction target value.

In step S706, the camera CPU 12a continuously outputs the image blur correction target value. The term "continuously" here indicates continuous output from the image blur correction target value fixed in step S703. The reason for continuous output from the fixed image blur correction target value will be described with reference to FIG. 8. FIG. 8 is a diagram illustrating setting of an image blur correction target value.

An image blur is also generated during the target value fixation period 53a. Therefore, if the target value fixation period 53a is not provided, the image blur correction target value 53 of the imaging element 14a except for a shock error is set as in a broken-line waveform 81 in accordance with the detection result of the vibration detection unit 15. Therefore, when the target value fixation period 53a ends, the fixed image blur correction target value 53 shown by a solid-line waveform 82 and the broken-line waveform 81 become discontinuous, and thus a stepped difference 83 is generated. In a case where image blur correction based on the broken-line waveform 81 is performed at the end of the target value fixation period 53a, a driving vibration according to the stepped difference 83 is generated in the image blur correction unit 14.

Consequently, in the present embodiment, at a point in time of the end of the target value fixation period 53a, an image blur correction target value 82 initialized by the signal processing unit 16 is added to the fixed first value A. The image blur correction target value is configured to gradually match an actual image blur correction target value over a predetermined time (for example, 0.2 seconds). Meanwhile, the initialization of an image blur correction target value corresponds to, for example, setting a history of a known IIR filter in the signal processing unit 16 to zero. The image blur correction unit 14 can smoothly restart the image blur correction by outputting an image blur correction target value continuously from the image blur correction target value fixed in the target value fixation period 53a.

Meanwhile, in the present embodiment, the image blur correction target value in the direction of pixel shift driving has been described, but there is no limitation thereto. There is the possibility of the above-described shock error being generated not only in the direction of pixel shift driving but also in a direction orthogonal to the direction of pixel shift driving due to a shock. Therefore, it is also preferable to provide a target value fixation period with respect to the image blur correction target value in a direction orthogonal to the direction of pixel shift driving.

Figure 9:
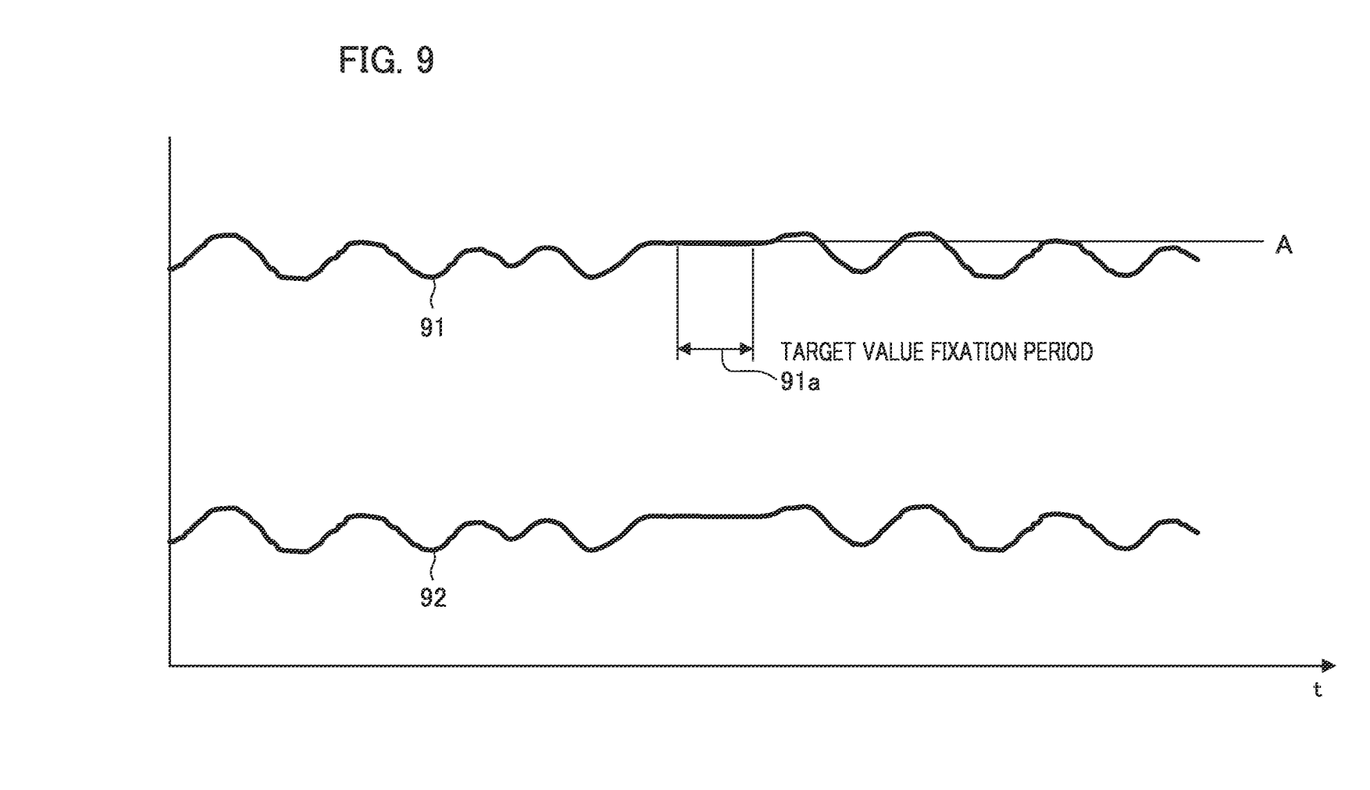
FIG. 9 is a diagram illustrating control of the vibration-proof control unit in pixel shift image capture.

The setting of a target value fixation period in a direction orthogonal to the direction of pixel shift driving will be described with reference to FIG. 9. FIG. 9 is a diagram illustrating control of the vibration-proof control unit 17 in pixel shift image capture of the present embodiment. The image blur correction in the direction of the arrow 21y in FIG. 2 when the movement L2 in FIG. 4 is performed will be described as an example.

An image blur correction target value 91 is an image blur correction target value which is given to the image blur correction unit 14 when image blur correction is performed in the direction of the arrow 21y, and a waveform 92 is the movement of the imaging surface of the imaging element 14a based on the image blur correction target value 91. Although the pixel shift driving is not performed in the direction of the arrow 21y, the shock of the image blur correction unit 14 due to a pixel shift in the direction of the movement L2 is generated, and thus the driving of the image blur correction unit 14 is further stabilized by providing a target value fixation period 92a at the same timing as the target value fixation period 53a.

As described above, according to the present embodiment, it is also possible to perform high-accuracy image blur correction in a high-resolution image capture mode for synthesizing images obtained in a plurality of still image exposures.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-004116, filed Jan. 15, 2020, which is hereby incorporated by reference wherein in its entirety.

What is claimed is:

1. An imaging device that performs a first process of moving an imaging element a predetermined amount with respect to the imaging device for each exposure to acquire a plurality of images, the imaging device comprising:
at least one processor and a memory holding a program which makes the processor function as:
a target value setting unit configured to set an image blur correction target value on the basis of a shake of the imaging device detected by a detection unit; and
a correction unit configured to perform a second process of correcting an image blur in accordance with the image blur correction target value,
wherein the correction unit performs the second process during each exposure to acquire the plurality of images, and
wherein the target value setting unit fixes the image blur correction target value to a predetermined value when the first process is performed.

2. The imaging device according to claim 1, wherein the target value setting unit releases fixation of the image blur correction target value at an end of the first process, and sets a value continuous from the predetermined value as the image blur correction target value.

3. The imaging device according to claim 2, wherein the end of the first process is a point in time at which a shock applied to the imaging element associated with the first process converges.

4. The imaging device according to claim 2, wherein the end of the first process is a point in time at which a predetermined time has elapsed from a start of the first process.

5. An imaging device that performs a first process of moving an imaging element a predetermined amount for each exposure to acquire a plurality of images and synthesizes the plurality of images to generate a high-resolution image, the imaging device comprising:
at least one processor and a memory holding a program which makes the processor function as:
a target value setting unit configured to set an image blur correction target value on the basis of a shake of the imaging device detected by a detection unit; and
a correction unit configured to perform a second process of correcting an image blur in accordance with the image blur correction target value,
wherein the target value setting unit fixes the image blur correction target value to a predetermined value when the first process is performed, and
wherein the target value setting unit initializes the image blur correction target value based on the shake detected by the detection unit at an end of the first process, and adds the initialized value to the predetermined value.

6. The imaging device according to claim 5, wherein the end of the first process is a point in time at which a shock applied to the imaging element associated with the first process converges.

7. The imaging device according to claim 5, wherein the end of the first process is a point in time at which a predetermined time has elapsed from a start of the first process.

8. The imaging device according to claim 1, wherein the target value setting unit fixes the image blur correction target value in a direction in which the imaging device is moved by the first process to a predetermined value when the first process is performed.

9. The imaging device according to claim 1, wherein the target value setting unit fixes each of the image blur correction target value in a direction in which the imaging device is moved by the first process and a direction orthogonal to the direction to a predetermined value when the first process is performed.

10. An image blur correction method of an imaging device that performs a first process of moving an imaging element a predetermined amount with respect to the imaging device for each exposure to acquire a plurality of images, the method comprising:
setting an image blur correction target value on the basis of a shake of the imaging device detected by a detection unit; and
correcting for performing a second process of correcting an image blur in accordance with the image blur correction target value, wherein the second process is performed during each exposure to acquire the plurality of images,
wherein, in the setting of the image blur correction target value, the image blur correction target value is fixed to a predetermined value when the first process is performed.

11. A non-transitory storage medium on which is stored a program of an imaging device that performs a first process of moving an imaging element a predetermined amount with respect to the imaging device for each exposure to acquire a plurality of images, the imaging device executing the following on the basis of the program:
target value setting for setting an image blur correction target value on the basis of a shake of the imaging device detected by a detection unit; and
correcting for controlling a correction unit in accordance with the image blur correction target value to perform a second process of correcting an image blur, wherein the second process is performed during each exposure to acquire the plurality of images,
wherein the target value setting fixes the image blur correction target value to a predetermined value when the first process is performed.

12. The imaging device according to claim 1, wherein the plurality of images is synthesized in order to generate a high resolution image.

* * * * *